United States Patent
Eastman et al.

(10) Patent No.: US 7,689,743 B2
(45) Date of Patent: Mar. 30, 2010

(54) DATA COPY SYSTEM APPARATUS AND METHOD

(75) Inventors: Justin Paul Eastman, Tucson, AZ (US);
Jeffrey Richard Suarez, Tucson, AZ (US); Andrew Nelson Wilt, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/613,880

(22) Filed: Dec. 20, 2006

(65) Prior Publication Data
US 2008/0154968 A1    Jun. 26, 2008

(51) Int. Cl.
*G06F 3/00*    (2006.01)
*G06F 5/00*    (2006.01)

(52) U.S. Cl. .......................................... 710/58; 710/59
(58) Field of Classification Search ................ 710/58
See application file for complete search history.

(56) References Cited

U.S. PATENT DOCUMENTS

| | | | |
|---|---|---|---|
| 5,727,211 A | 3/1998 | Gulsen | 395/678 |
| 5,838,968 A | 11/1998 | Culbert | 395/674 |
| 6,108,350 A * | 8/2000 | Araujo et al. | 370/467 |
| 6,249,836 B1 | 6/2001 | Downs et al. | 710/268 |
| 6,611,901 B1 | 8/2003 | Micka et al. | |
| 7,032,090 B2 | 4/2006 | Hulsey | 711/162 |
| 7,130,931 B2 * | 10/2006 | Thompson et al. | 710/17 |
| 2002/0199060 A1 * | 12/2002 | Peters et al. | 711/114 |
| 2004/0260896 A1 * | 12/2004 | Werner et al. | 711/162 |
| 2005/0125797 A1 | 6/2005 | Gabrani et al. | 718/100 |
| 2006/0004889 A1 | 1/2006 | Shackelford | |

OTHER PUBLICATIONS

PCT International Search Report and Written Opinion, Jul. 10, 2008.

* cited by examiner

*Primary Examiner*—Alford W Kindred
*Assistant Examiner*—Zachary K Huson
(74) *Attorney, Agent, or Firm*—Kunzler & McKenzie

(57) ABSTRACT

An apparatus, system, and method are disclosed for copying data. The present invention includes a data storage subsystem that supports fast replication and a host system that communicates a fast replication request to the data storage subsystem, estimates an expected wait time for a pending fast replication operation if the fast replication request is not granted, awaits the expiration of the wait time, communicates an additional fast replication request to the data storage subsystem, and records the data as moved if the additional fast replication is granted. In certain embodiments, the host system moves the data via conventional I/O operations if the expected wait time exceeds an expected duration for the conventional I/O operations.

19 Claims, 4 Drawing Sheets

DATA COPY SYSTEM APPARATUS AND METHOD

BACKGROUND OF THE INVENTION

1. Field of the Invention

This invention relates to systems, apparatus, and methods for managing data and more particularly relates to systems, apparatus, and methods for copying data.

2. Description of the Related Art

Efficient data copy/move solutions are an important aspect of managing and storing data. Data copying may include operations wherein data is moved from one location to another such as defragmenting data or backing up data. Solutions for copying data include conventional input/output (I/O) operations where a host system reads and writes data to and from a data storage device. Such an approach is effective to copy data but creates undesirable data copy overhead due to the necessary input/output operations.

Another data copy solution includes fast replication, such as IBM's FlashCopy®, where a single request is sent from a host system to a data storage subsystem and the data storage subsystem carries out the entire copy operation. Fast replication is often viewed as faster and more efficient than the input/output approach because fast replication eliminates the need for multiple input/output operations. Though fast replication may reduce the data copy overhead created by input/output operations, certain problems exist.

For example, if a host system sends a fast replication request corresponding to data already in a fast replication relationship, the fast replication request can not be performed. Consequently, the host system copies the data with conventional I/O operations because waiting for the data to become available for fast replication could take longer than copying the data with conventional I/O operations. In other words, because the host system has no way of estimating when the data will be available for fast replication, the data is copied via conventional I/O operations.

In summary, due to the problems previously described, fast replication operations remain underutilized.

SUMMARY OF THE INVENTION

From the foregoing discussion, a need exists for an enhanced system, apparatus, and method for copying data. Beneficially, such a system, apparatus and method would maximize the data copied via fast replication by providing a solution for estimating when data will be available for fast replication and communicating additional fast replication requests.

The present invention has been developed in response to the present state of the art, and in particular, in response to the problems and needs in the art that have not yet been fully solved by currently available data copy solutions. Accordingly, the present invention has been developed to provide an apparatus, system, and method for copying data that maximizes the data copied via fast replication by providing a solution for estimating when data will be available for fast replication and communicating additional fast replication requests.

In one aspect of the present invention, a system for copying data includes a data storage subsystem capable of supporting fast replication and a host system that communicates a fast replication request for data to the data storage subsystem, estimates an expected wait time for a pending fast replication operation if the fast replication request is not granted, awaits the expiration of the expected wait time, communicates an additional fast replication request for the data to the data storage subsystem, and records the data as moved if the additional fast replication request is granted. In certain embodiments, the host system moves the data via conventional I/O operations if the expected wait time exceeds an expected duration for conducting conventional I/O operations.

In some embodiments, the host system records the data as moved if the data is moved via conventional I/O operations. In certain embodiments, a fast replication request may include a request to move the data to a location local to the data storage subsystem. In other embodiments, a fast replication request may include a request to move the data to a non-local location with respect to the data storage subsystem. In certain embodiments, the host system adjusts the expected wait time according to a work load of the data storage subsystem. In certain embodiments, the host removes the data from a list of data to be moved and records the time the data is moved.

In one aspect of the present invention an apparatus for copying data includes a communication module that communicates a fast replication request for the data to a data storage subsystem, a synchronization module that estimates an expected wait time for a pending fast replication operation if the fast replication request is not granted, and a data management module that awaits the expiration of the expected wait time. The communication module also communicates an additional fast replication request for the data to the data storage subsystem and the data management module records the data as moved if the additional fast replication request is granted. In some embodiments, an I/O module moves the data via conventional I/O operations if the expected wait time exceeds an expected duration for conducting conventional I/O operations.

A method of the present invention is also presented for copying data. The method in the disclosed embodiments substantially includes the operations necessary to carry out the functions presented above with respect to the described system and apparatus. In one embodiment, the method includes communicating a fast replication request for data to a data storage subsystem, estimating an expected wait time for a pending fast replication operation if the fast replication request is not granted, waiting for expiration of the expected wait time, communicating an additional fast replication request for the data to the data storage subsystem, and recording the data as moved if the additional fast replication request is granted. In some embodiments, the method also includes moving the data via conventional I/O operations if the expected wait time exceeds an expected duration for conducting conventional I/O operations.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
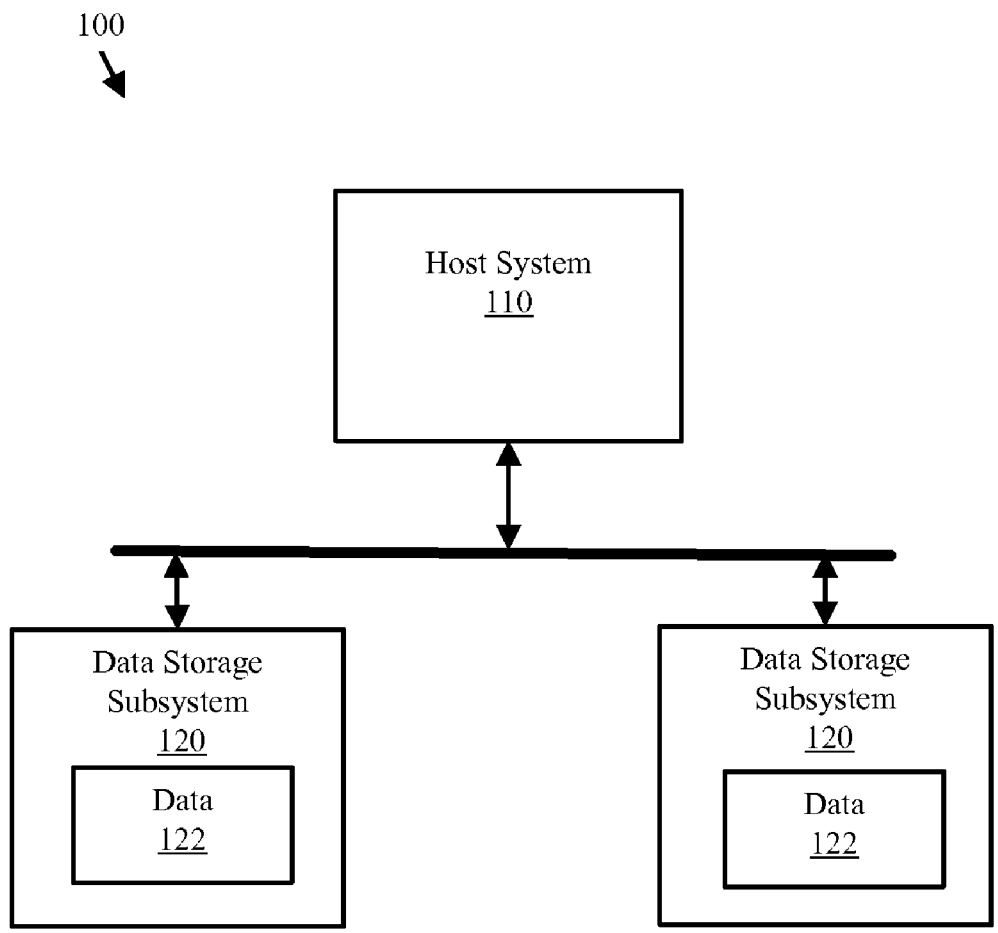
FIG. 1 is a schematic block diagram of one embodiment of data copy system in accordance with the present invention.

Many of the functional units described in this specification have been labeled as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, among different processors, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of generating a signal, causing a signal to be generated, or causing execution of a program of machine-readable instructions on a digital processing apparatus. A computer readable medium may be embodied by a transmission line, a compact disk, digital-video disk, a magnetic tape, a Bernoulli drive, a magnetic disk, holographic disk or tape, a punch card, flash memory, magnetoresistive memory, integrated circuits, or other digital processing apparatus memory device.

Furthermore, the described features, structures, or characteristics of the invention may be combined in any suitable manner in one or more embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram of one embodiment of a data copy system 100 in accordance with the present invention. The depicted system 100 includes a host system 110 and one or more data storage subsystems 120. The components of the system 100 cooperate to increase data copying efficiency.

In one embodiment, the host system 110 communicates a fast replication request for data 122 to a data storage subsystem 120. A data storage subsystem 120 may include any device capable of supporting a fast replication or Flash-Copy® relationships and/or operations. If the fast replication request is granted by the data storage subsystem 120, the host system 110 may record the data 122 as moved. If the fast replication request is not granted, the host system 110 may estimate an expected wait time for a pending fast replication operation. In some embodiments, the expected wait time is intended to predict a time when the data 122 will be available for fast replication.

In certain embodiments, the host system 110 may wait for the expiration of the expected wait time, and thereupon communicate an additional fast replication request to the data storage subsystem 120. If the additional fast replication request is granted, the host system 110 may record the data 122 as moved. In some embodiments, if the additional fast replication request is not granted, the host system 110 again cycles through the operations of estimating an expected wait time, waiting for expiration of the wait time, and communicating another fast replication request, until a fast replication request for the data 122 is granted. Interspersing fast replication requests with periods of waiting increases efficiency by reducing the probability that unsuccessful fast replication requests will be sent to the data storage subsystem 120.

In certain embodiments, the host system 110 adjusts the expected wait time according to a current work load of the data storage subsystem 120. In some embodiments, the host system 110 moves the data 122 via conventional I/O operations if the expected wait time exceeds the expected duration for the conventional I/O operations. In this manner, the present invention is capable of determining and requesting the most efficient data copy solution, depending upon the work load of the data storage subsystem 120.

Figure 2:
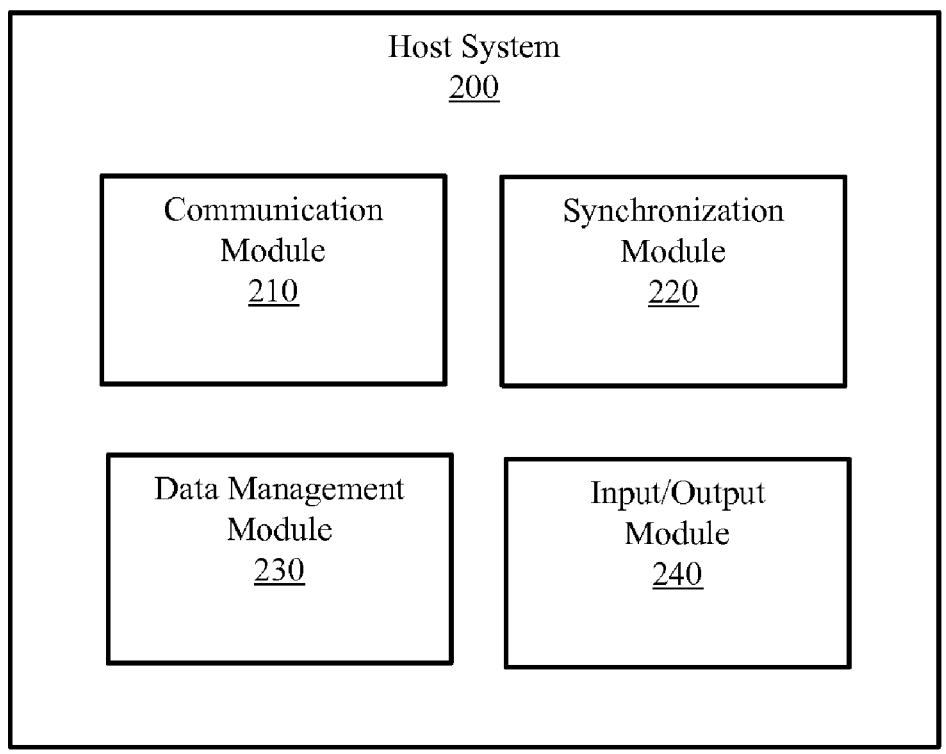
FIG. 2 is a schematic block diagram of one embodiment of a host system in accordance with the present invention.

FIG. 2 is a schematic block diagram of one embodiment of a host system 200 in accordance with the present invention. The depicted host system 200 includes a communication module 210, a synchronization module 220, a data management module 230, and an input/output module 240. The modules of the host system 200 cooperatively adapt to facilitate efficient data copy solutions.

In certain embodiments, the communication module 210 communicates a fast replication request for data to a data storage subsystem (not shown). A fast replication request may include a command to establish a fast replication relationship or FlashCopy® operation. The data involved in the fast replication relationship or operation may be organized by atomic units of movement such as bytes, words, blocks, tracks, sectors, extents, or the like. In some embodiments, the fast replication request includes a request to copy data to and from a location local to the data storage subsystem. In other embodiments, a fast replication request includes a request to copy data to or from a non-local location with respect to the data storage subsystem.

The data management module 230 may record the data as moved if the fast replication request is granted. In certain embodiments, recording the data as moved may include removing an entry representing the data from a list of entries representing data to be moved, and recording the time the fast replication request was granted. In this manner, the host system 200 may maintain a current and organized list of data to be copied.

If the fast replication request is not granted, the synchronization module 220 may estimate an expected wait time for a pending fast replication operation. In certain embodiments, the communication module 210 communicates an additional fast replication request to the data storage subsystem after expiration of the expected wait time. If the additional fast replication request is granted, the data management module 230 may record the data as moved. If the additional fast replication request is not successful, the host system 200 may iterate through some or all of the foregoing operations to communicate yet another fast replication request after an expected wait time.

In some embodiments, the input/output module 240 moves the data via conventional I/O operations if the expected wait time exceeds the expected duration for the conventional I/O operations. In such embodiments, the data management module 230 may record the data as moved and the time of the movement. In some embodiments, the data management module 230 records the data as moved by conventional I/O operations as opposed to fast replication. Accordingly, the present invention is capable of determining the most efficient way to copy data, issuing fast replication requests or conventional input/output commands to do so, and recording the status of the data copied.

In some embodiments, the synchronization module 220 is capable of adjusting the expected wait time according to a work load of the data storage subsystem. For example, if the data storage subsystem 120 is experiencing a reduced work load the synchronization module 220 may reduce the expected wait time for future fast replication requests. Similarly, if the data storage subsystem 120 is experiencing an increased work load, the synchronization module 220 may increase the expected wait time for future fast replication requests. Accordingly, the system 110 minimizes the number of communications sent between the host system 110 and data storage subsystems 120 by enabling an adjustable wait time for fast replication requests.

Figure 3:
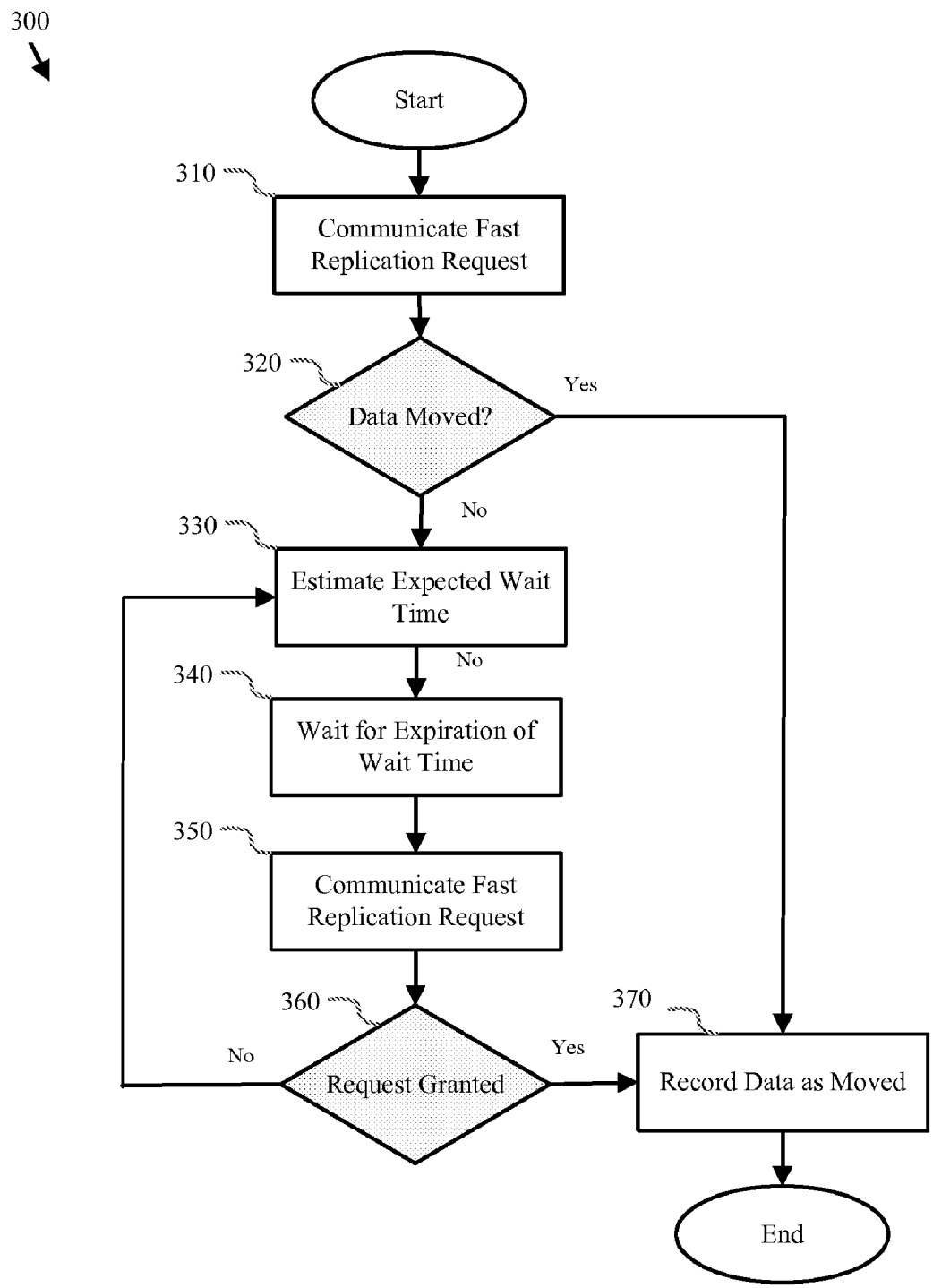
FIG. 3 is a flow chart diagram of one embodiment of a method for copying data in accordance with the present invention.

FIG. 3 is a flow chart diagram of one embodiment of a method 300 for copying data in accordance with the present invention. The depicted method 300 includes the operations of communicating 310 a fast replication request, determining 320 whether the fast replication request was granted, estimating 330 an expected wait time for a pending fast replication request, waiting 340 for expiration of the expected wait time, communicating 350 another fast replication request, determining 360 if the additional fast replication request is granted, and recording 370 the data as moved if the fast replication request is granted. The operations of the method 300 illustrate one approach for efficiently copying data.

Communicating 310 a fast replication request may include a host system 110 communicating a fast replication request for data 122 to a data storage subsystem 120. Determining 320 if the fast replication request is granted may include the data storage subsystem 120 carrying out the fast replication request. If the fast replication request is granted the host system 110 may record 370 the data as moved. In certain embodiments, recording 370 the data as moved may include removing an entry representing the data from a list of entries representing data to be moved. A rejected fast replication request may include a scenario where the data corresponding to the fast replication requests is already in a fast replication relationship.

If the fast replication request is not granted 320, the host 110 may estimate 330 an expected wait time for a pending fast replication operation. Estimating 330 an expected wait time may include multiplying the quantity of data to be moved by a selected index value. Waiting 340 for expiration of the expected wait time may include the host system 110 not sending fast replication requests to the data storage subsystem 120. Once the expected wait time has expired 340 the host 110 may communicate 350 another fast replication request to the data storage subsystem 120.

Determining 360 if the fast replication request is granted may include the data storage subsystem 120 implementing the fast replication request. If the fast replication is granted, the host system 110 may record 370 the data as moved. If the fast replication request is not granted the host system may again estimate an expected wait time for the next fast replication request.

Figure 4:
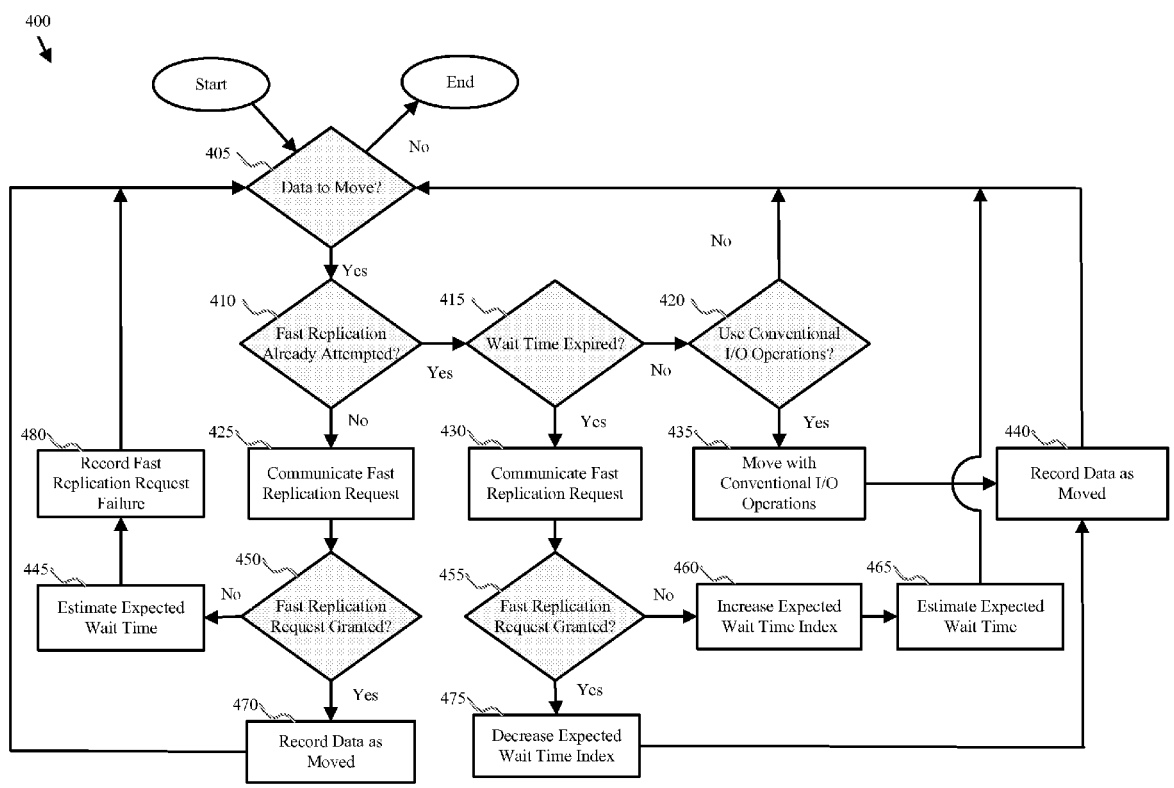
FIG. 4 is a flow chart diagram of one embodiment of a method for copying data in accordance with the present invention.

FIG. 4 is a flow chart diagram of one embodiment of a method 400 for copying data in accordance with the present invention. The depicted method 400 includes multiple operations including determining 405 whether there is data to move, communicating 425 a fast replication request, communicating 430 additional fast replication requests, and moving 435 data via conventional I/O operations where appropriate. The operations of the method 400 demonstrate one of many possible methods of the present invention for copying or moving data.

Determining 405 whether there is data to move may include a host system 110 accessing a list, array, or table of entries (not shown) representing data to be moved. For purposes of explaining FIG. 4, the table of entries includes a first entry representing a first data track on a data storage subsystem. However, in certain embodiments or examples, the list of entries includes multiple entries that need to be moved or copied. Once the host system 110 determines the list of entries includes a first entry, the host system 110 may determine 410 whether a fast replication request has been attempted for the first entry.

If a fast replication request has not been attempted, the host system 110 may communicate 425 a fast replication request for the first data track to a data storage subsystem 120. If the fast replication request is granted 450, the host system may record 470 the first data track as moved. In certain embodiments, this may include removing the first entry from the list of entries and noting the time of the move.

If the fast replication request is not granted 450, the host system 110 may estimate 445 an expected wait time that estimates when the first data track will be available for moving. In certain embodiments, this may include estimating when the first data track will leave a fast replication relationship. In some embodiments, this may include multiplying the number of data units to be moved by a wait time index selected to represent an average time for the data storage subsystem 120 with an average work load to move one unit of data.

After estimating 445 an expected wait time, the host system may record 480 the fast replication request as failed for the first entry. After recording 480 the fast replication failure or recording 470 the data as moved, the host system 110 may again determine 405 whether there is data to move. Assuming the fast replication attempt was not granted 450, the host system 110 will discover that the first entry still remains in the list of entries. Accordingly, the host system 110 will determine 410 whether a fast replication attempt has been attempted for the first entry.

Because a fast replication request was attempted for the first entry, the host system 110 will determine 415 if the expected wait time has expired. If the expected wait time has expired, the host system 110 may communicate 430 another fast replication request to the data storage subsystem 120. If the fast replication request is granted 455, the host system 110 may decrease 475 the time index upon the assumption that the data storage subsystem is experiencing a lower average work load. After decreasing 475 the expected wait time index, the host system 110 may record the data as moved.

Assuming the fast replication request was not granted 455, the host system may increase 460 the expected wait time index upon the assumption that the failed fast replication attempt is due to data storage subsystem 120 experiencing an elevated work load. The host system 110 may then estimate 465 an expected wait time for another fast replication request. In some embodiments, estimating 465 the expected wait time may include multiplying the number of data units to be moved by the recently increased wait time index. The host system 110 may then return to determining 405 if there is data to be moved.

Assuming now that the wait time for the first entry has not expired 415, the host system 420 may determine 410 whether to use conventional I/O operations to move the first data track. Determining 410 whether to use conventional I/O operations may include comparing the remaining estimated wait time with the estimated time to copy the data via conventional I/O operations. If conventional I/O operations would take longer, the host system 110 may once again return to determining 405 if there is data to be moved. Assuming the conventional I/O operations would take less time than the remaining expected wait time, the host system 110 may move 435 the first data track via conventional I/O operations. After moving the data, the host system 110 may record 440 the first data track as moved and return again to determining 405 whether there is data to be moved.

In some embodiments, if the host system 110 communicates an unsuccessful fast replication request to the data storage subsystem 120 for each entry in the list of entries, the host device 110 may return to the top of the list of remaining entries, with no successfully processed entries, and copy the first entry by conventional I/O operations, even if the expected wait time for the first entry does not exceed the expected duration for the conventional I/O operation. Copying the first entry via conventional I/O operations under such conditions enables the host system 110 to copy data while awaiting the expiration of the expected wait times of the remaining entries.

The present invention improves system efficiency for copying or moving data. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for copying data, the system comprising:
at least one data storage subsystem configured to support fast replication operations;
a host system configured to:
communicate a first fast replication request for data to the at least one data storage subsystem, the first fast replication request comprising a request for the data to be moved via a fast replication operation;
estimate an expected wait time for completion of a pending fast replication operation on the at least one data storage subsystem if the first fast replication request is not granted by the at least one data storage subsystem;
move the data requested by the first fast replication request via conventional input/output (I/O) operations if the expected wait time exceeds an expected duration for moving the data via the conventional I/O operations;
await the expiration of the expected wait time if the expected wait time does not exceed the expected duration for moving the data via conventional I/O operations;
communicate a second fast replication request for the data to the at least one data storage subsystem after expiration of the expected wait time, the second fast replication request comprising a request for the data to be moved via a fast replication operation; and
record the data as moved if the second fast replication request is granted.

2. The system of claim 1, wherein the host system is further configured to record the data as moved if the data is moved via conventional I/O operations.

3. The system of claim 1, wherein the host system is further configured to adjust the expected wait time according to a work load of the at least one data storage subsystem.

4. The system of claim 1, wherein the host system is further configured to record the data as moved by removing an entry representing the data from a list of entries representing data to be moved.

5. The system of claim 1, wherein the host system is further configured to record the time when the data is moved.

6. The system of claim 1, wherein the fast replication request is a request to move the data to a non-local location with respect to the at least one data storage subsystem.

7. An apparatus for copying data, the apparatus comprising:
a communication module configured to communicate a first fast replication request for data to a designated data storage subsystem;
a synchronization module configured to estimate an expected wait time for completion of a pending fast replication operation involving data on the designated data storage subsystem if the first fast replication request is not granted by the designated data storage subsystem;
a data management module configured to await the expiration of the expected wait time;
the communication module further configured to communicate a second fast replication request for the data to the designated data storage subsystem that rejected the first fast replication request after expiration of the expected wait time; and the data management module further configured to record the data as moved if the second fast replication request is granted.

8. The apparatus of claim 7, wherein the data management module is further configured to move the data requested by the first fast replication request via conventional input/output (I/O) operations if the expected wait time exceeds an expected duration for the conventional I/O operations, and wherein the data management module awaits the expiration of the expected wait time if the expected wait time does not exceed the expected duration of the conventional I/O operations.

9. The apparatus of claim 8, wherein the data management module is further configured to record the data as moved.

10. The apparatus of claim 7, wherein the synchronization module is further configured to adjust the expected wait time according to a work load of the data storage subsystem.

11. The apparatus of claim 7, the data management module is further configured to record the data as moved by removing an entry representing the data from a list of entries representing data to be moved.

12. The apparatus of claim 7, wherein the data management module is further configured to record the time the data is moved.

13. A computer readable storage medium tangibly embodying a program of machine-readable instructions executable by a digital processing apparatus to perform operations for copying data, the operations comprising:
communicating a first fast replication request for data to a designated data storage subsystem;
estimating an expected wait time for completion of a pending fast replication operation involving data on the designated data storage subsystem if the first fast replication request is not granted by the designated data storage subsystem;
waiting for expiration of the expected wait time;
communicating a second fast replication request for the data to the designated data storage subsystem that did not grant the first fast replication request after expiration of the expected wait time; and
recording the data as moved if the second fast replication request is granted.

14. The computer readable storage medium of claim 13, wherein the operations further comprise moving the data requested by the first fast replication request via conventional input/output (I/O) operations if the expected wait time exceeds an expected duration for the conventional I/O operations, and wherein the data management module awaits the expiration of the expected wait time if the expected wait time does not exceed the expected duration of the conventional I/O operations.

15. The computer readable storage medium of claim 14, wherein the operations further comprise recording the data as moved if the data is moved.

16. The computer readable storage medium of claim 13, wherein the operations further comprise adjusting the expected wait time according to a work load of the data storage subsystem.

17. The computer readable storage medium of claim 13, wherein recording the data as moved comprises removing an entry representing the data from a list of entries representing data to be moved.

18. The computer readable storage medium of claim 13, wherein the operations further comprise recording the time the data is moved.

19. A method for copying data, the method comprising:
communicating a fast replication request for data to at least one data storage subsystem, the first fast replication request comprising a request for the data to be moved via a fast replication operation;
estimating an expected wait time for completion of a pending fast replication operation on the at least one data storage subsystem if the first fast replication request is not granted by the at least one data storage subsystem;
moving the data requested by the first fast replication request via conventional input/output (I/O) operations if the expected wait time exceeds an expected duration for moving the data via the conventional I/O operations;
waiting for expiration of the expected wait time if the expected wait time does not exceed the expected duration for moving the data via the conventional I/O operations;
communicating a second fast replication request for the data to the at least one data storage subsystem after expiration of the expected wait time, the second fast replication request comprising a request for the data to be moved via a fast replication operation; and
recording the data as moved if the second fast replication request is granted.

* * * * *